Dec. 31, 1929.  G. A. ANSELL  1,741,491

PRESSURE HOSE AND METHOD OF MAKING SAME

Filed Dec. 10, 1928

Inventor.
George Albert Ansell.

by H. J. S. Dennison
atty.

Patented Dec. 31, 1929

1,741,491

UNITED STATES PATENT OFFICE

GEORGE ALBERT ANSELL, OF TORONTO, ONTARIO, CANADA, ASSIGNOR TO THE DUNLOP TIRE & RUBBER GOODS CO., LIMITED, OF TORONTO, ONTARIO, CANADA

PRESSURE HOSE AND METHOD OF MAKING SAME

Application filed December 10, 1928, Serial No. 324,964, and in Canada July 16, 1928.

The principal objects of this invention are, to produce a hose capable of retaining high internal pressures without disruption and without material distortion and which will be extremely flexible and durable.

A further and important object is to devise a construction which may be made at a very moderate cost.

The principal feature of the invention consists in incorporating into the body of the hose structure outside of the main flexible textile body, a continuous spiral wrapping of a tubularly braided metallic strip which is solidly embedded in a rubber and fabric case.

In the drawings, Figure 1 is a perspective view of a section of a hose constructed in accordance with the present invention.

Figure 1:
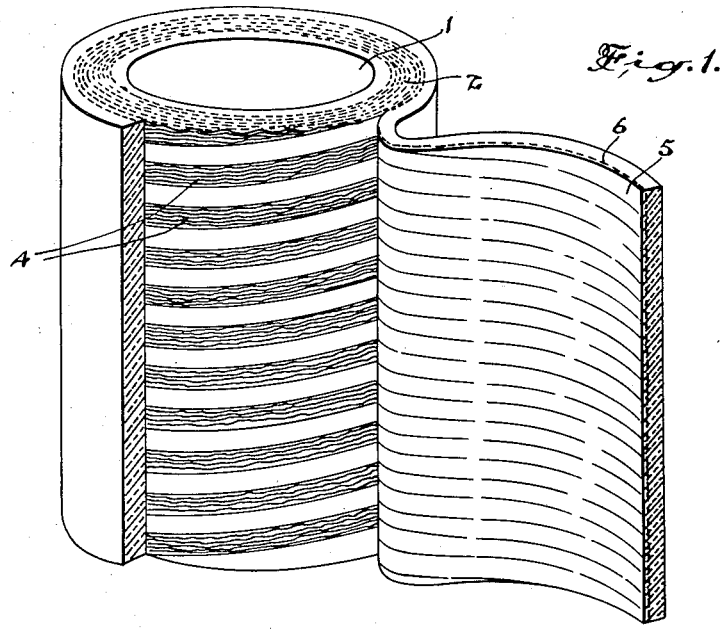
Figures 2, 3, 4:
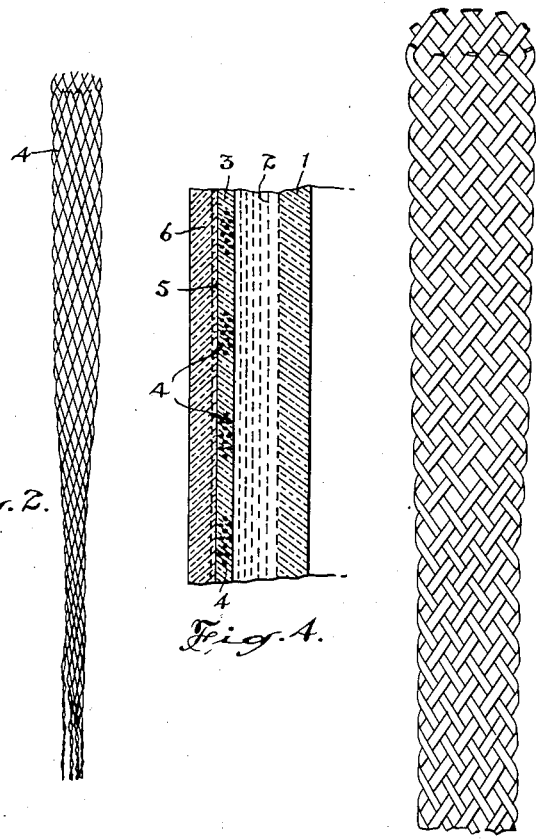
Figure 2 is a perspective detail of a length of the braided wire reinforcement showing one end thereof expanded.
Figure 3 is a perspective detail of a modified form of braided reinforcement for extremely heavy tubes.
Figure 4 is an enlarged longitudinal sectional detail of the improved hose.

In the manufacture of flexible pressure hose it has been known to incorporate into a textile casing, woven wire fabrics of different kinds and a flat stranded wire tape has been spirally arranged, but the present invention proposes a novel construction which produces a number of important results.

In the construction herein shown the inner tube or water tight section 1 is surrounded by a plurality of wrappings of textile fabric 2.

The exterior of the plurality of wrappings is covered with a coating 3 of rubber and around this rubber coating is placed in spiral arrangement a narrow flexible strip 4 of braided wire.

The wire 4 is braided in tubular form and when drawn taut around the circumference of the tube it flattens out forming a narrow double thickness ribbon of fine strands of wire. This tubular braided wire ribbon is spirally wound around the hose body in fairly closely arranged coils, that is to say, the coils of the spiral are placed apart approximately one-half or three-quarters of the full width of the braided strip, the spacing being sufficient to provide a very substantial body of rubber between the coils so that there will be no likelihood of the various coils chafing one against the other.

The wire used in the manufacture of the braided strip is fine and extremely flexible and being braided in a double thickness it lies snugly in place, providing a great variety of fine interstices with which the rubber interlocks.

The fine braided wire will flex in all directions quite freely within the rubber body without the danger of separating the layers.

The flexible band thus applied to the main body of the rubber hose is covered by a further coating 5 of rubber and a thin cover band of textile material 6.

The hose when thus completed is extremely flexible and very strong.

In the manufacture of this hose it is desirable that the wire braid be laid over a layer of rubber placed around the fabric body and that it be drawn taut in being wound thereon so that it will be completely embedded in the rubber and when the curing is effected the rubber will flow into the interstices between the wires to reduce to the minimum the slippage of the wires in the subsequent flexing of the hose and also reducing the frictional contact of the braided wires.

The tubular braid structure enables the use of very flexible wires and there is in effect a double layer of wires in a flexible rubber cored cord structure.

What I claim as my invention is:—

1. In a pressure hose, the combination with a fabricated body, of a tubular wire braid wound spirally of the body and embedded therein.

2. In a pressure hose, the combination with a fabricated body, of a flexible binding wound spirally and embedded in said body, said binding comprising a plurality of fine wires braided in tubular form and drawn taut.

3. A hose comprising an inner rubber tube, a plurality of layers of rubberized fabric encircling said tube, a layer of rubber encircling said fabric, a tubular braid formed of open mesh metal strands wound spirally and embedded in said rubber layer, and an outer cover of rubber enclosing said braid.

4. A hose comprising a tubular body structure of rubber and rubberized fabric, having an outer layer of rubber, a length of tubularly braided wire wound spirally arond said body structure, the convolutions being spaced apart a distance less than the width of the braid, and an outer covering of rubber and rubberized fabric all cured together with the braid embedded in the rubber layer over which it is wound.

5. A method of making hose consisting in first forming a ruber hose with a plurality of plies of rubberized fabric, then placing a layer of rubber over the fabric, then winding a tubular braided metallic strip spirally around the rubber fabric with the convolutions spaced apart then placing a composite layer of rubber and fabric around the structure and finally curing the whole to flow the rubber through the meshes of the braided metallic strip.

GEORGE ALBERT ANSELL.